United States Patent [19]

Janssen et al.

[11] Patent Number: 4,978,481
[45] Date of Patent: Dec. 18, 1990

[54] PROCESS FOR THE ENCAPSULATION OF PREFORMED SUBSTRATES BY GRAFT COPOLYMERIZATION

[75] Inventors: Robert A. Janssen, Alpharetta; Earl C. McCraw, Jr., Duluth; Paul C. Nicholson, Dunwoody, all of Ga.

[73] Assignee: Ciba-Geigy Corporation, Ardsley, N.Y.

[21] Appl. No.: 297,019

[22] Filed: Jan. 13, 1989

[51] Int. Cl.$^5$ .............................................. B29D 11/00
[52] U.S. Cl. ..................... 264/1.4; 264/1.7; 264/2.6; 427/164; 427/301; 427/302
[58] Field of Search ................... 264/1.7, 1.4, 2.6, 22, 264/25, 129; 427/164, 301, 302

[56] References Cited

U.S. PATENT DOCUMENTS

| | | | |
|---|---|---|---|
| 3,008,920 | 11/1961 | Urchick | 525/245 |
| 3,070,573 | 12/1962 | Beck | 525/244 |
| 3,489,491 | 1/1970 | Creighton | 264/1.7 |
| 3,916,033 | 10/1975 | Merrill | 427/164 |
| 4,171,878 | 10/1979 | Kivaev et al. | 264/1.7 |
| 4,208,362 | 6/1980 | Deichert et al. | 264/1.7 |
| 4,311,573 | 1/1982 | Mayhan et al. | 525/246 |
| 4,589,964 | 5/1986 | Mayhan et al. | 427/302 |
| 4,761,436 | 8/1988 | Kohno et al. | 264/2.6 |

FOREIGN PATENT DOCUMENTS 2748568  5/1979  Fed. Rep. of Germany ....... 264/1.4

*Primary Examiner*—James Lowe
*Attorney, Agent, or Firm*—Luther A. R. Hall

[57] ABSTRACT

A process for encapsulating a preformed polymeric substrate comprises peroxidizing and hydroperoxidizing the surface of said preformed substrate using ozone and then carrying out a crosslinked graft copolymerization of selected ethylenically unsaturated monomers both on and surrounding (encapsulating) said substrate. Such encapsulation of substrates provides protective coatings, ablative coatings and, particularly, soft skirts for hard contact lenses.

19 Claims, No Drawings

PROCESS FOR THE ENCAPSULATION OF PREFORMED SUBSTRATES BY GRAFT COPOLYMERIZATION

This invention is to a process for encapsulating preformed polymer substrates by the controlled graft copolymerization thereon of selected ethylenically unsaturated monomers and to products made by said process.

BACKGROUND OF THE INVENTION

Graft polymerization per se has long been known in the art with many graft copolymers such as ABS (acrylonitrile butadiene/styrene) resins achieving considerable commercial success.

It has also been known in the art that various vinylic monomers can be graft polymerized onto polymer substrates which have been first treated with ionizing radiation in the presence of oxygen or with ozone to form peroxy groups on the surface of said substrate. U.S. Pat. Nos. 3,008,920 and 3,070,573 teach the grafting of selected monomers onto ozonated polymer substrates.

While such a process would in theory seem to be a panacean method to modify at will the surface characteristics of any polymer substrate, such is not the case as is seen in the teachings of U.S. Pat. Nos. 4,311,573 and 4,589,964.

The objective of such graft polymerization is to modify the surface of the polymer substrate without causing major changes in the physical characteristics of the substrate as a whole.

Problems have arisen when such a graft polymerization process is carried out. One serious complication involves graft polymerization of the vinylic monomer onto the substrate as desired, but with the simultaneous and undesired homopolymerization of the vinylic monomer. This problem can be minimized by carrying out the graft polymerization process in the presence of a metal redox system using a variable valence metal ion in the reduced state to convert any hydroxyl free radical present to hydroxyl ion and thus minimize the simultaneous homopolymerization problem. See U.S. Pat. Nos. 3,008,920, 4,311,573 and 4,589,964.

U.S. Pat. Nos. 4,311,573 and 4,589,964 teach that another problem encountered in the surface grafting of a preformed polymeric substrate concerns depth and density control of the graft. If the bulk properties of the substrate are to be retained, then the graft depth should be no greater than necessary to modify the surface characteristics of the article. Grafts of excessive depth, grafts of insufficient density to achieve the desired property modification and the swelling and degradation of the substrate article during the process are serious problems plaguing this panacean process.

U.S. Pat. Nos. 4,311,573 and 4,589,964 teach a method aimed at inhibiting homopolymerization, at controlling graft depth and at accelerating graft polymerization to increase graft density, namely by carrying out the graft polymerization in the presence of a variable metal ion (ferrous) and a complexing agent (squaric acid) to control mobility of said ions.

The instant process is an improvement over the process of U.S. Pat. Nos. 4,311,573 and 4,589,964 by controlling the depth of the graft polymerization on the substrate by saturating the polymer substrate on which grafting is to occur by a liquid in which the ethylenically unsaturated monomer system is insoluble. No complexing agent such as squaric acid is required in the instant process.

OBJECTS OF THE INVENTION

One object of this invention is to provide a facile process for encapsulating preformed polymeric substrate to impart desired properties thereto.

Another object of this invention is to prepare contact lenses with soft skirts or other useful materials by the process of this invention.

DETAILED DISCLOSURE

The instant invention is to a process for encapsulating a preformed polymer substrate which comprises
treating the preformed polymer substrate with ozone to form peroxy and hydroperoxy groups thereon, and
graft copolymerizing said peroxidized and hydroperoxidized substrate with an ethylenically unsaturated monomer or monomer mixture which must contain at least one crosslinking monomer to encapsulate the preformed polymer substrate with a coating of crosslinked polymer derived from said monomer or monomer mixture.

In preliminary steps in the instant process, the polymer substrate can be saturated or swollen with a liquid in which the ethylenically unsaturated monomer is insoluble either before or after the ozonization step to form the peroxy and hydroperoxy groups on said substrate is performed. This prevents penetration of said monomer into the interior of the substrate and directs subsequent graft polymerization of said monomer to the surface of the substrate.

In another embodiment of the instant invention, the polymer substrate can be contacted with a solution which is or contains a chain transfer agent, preferably a primary or secondary $C_1-C_4$-alkanol, to saturate or swell said polymer, said solution being insoluble in the perhalogenated liquid medium used subsequently during the ozonation step to limit the formation of hydroperoxy and peroxy groups to the surface of the polymer substrate.

A preferred embodiment of the instant invention is to a process for making a soft polymer skirt around the periphery of a rigid polymer contact lens which comprises
ozonating a rigid polymeric contact lens substrate to form peroxy and hydroperoxy groups thereon,
placing the ozonated lens in a mold wherein the center of the lens is covered and the periphery of said ozonated lens is exposed to an aqueous grafting solution containing a mixture of hydrophilic vinyl monomer, preferable 2-hydroxyethyl methacrylate, and a vinyl crosslinking agent, preferably ethylene glycol dimethacrylate, and
irradiating the mold with UV light to decompose the peroxy and hydroperoxy groups present in the peripheral portion of the ozonated lens to initiate graft crosslinked copolymerization with vinyl monomers in the grafting solution to form a graft copolymerized crosslinked soft vinyl polymer skirt around the periphery of the rigid contact lens thereby increasing eye comfort for and wearability of said lens.

The substrate after exposure to ozone will have on its surface both peroxy (—O—O—) and hydroperoxy (—OOH) groups. Upon thermal or otherwise induced decomposition, the peroxy groups cleave into two active free radicals attached to the surface of the polymeric substrate offering sites on the surface to initiate graft polymerization with the ethylenically unsaturated monomer.

On the other hand upon thermal or otherwise induced decomposition, the hydroperoxy groups also cleave into two active free radicals. One is attached to the polymer surface and is capable of initiating graft polymerization thereon while the other is a free hydroxyl radical not attached to the surface. This latter free radical is available to initiate homopolymerization of the monomer unless such homopolymerization is inhibited or suppressed.

U.S. Pat. Nos. 3,008,920 and 4,589,964 teach that an effective homopolymerization-inhibiting agent is the cuprous, ferrous or other variable valence metal ion such as those of cobalt, manganese, molybdenum, tin, indium, cerium, chromium, thallium and vanadium. A preferred metal salt providing such metal ion is ferrous ammonium sulfate although other ferrous salts such as ferrous sulfate, ferrous chloride, ferrous iodide and ferrous bromide can be used as well, These reduced valence (-ous) salts react with the hydroxyl free radical in a redox system to produce the hydroxyl radical and the oxidized (-ic) salt. With the concentration of hydroxyl free radical thus minimized or eliminated, there is no initiator for the homopolymerization which is now effectively suppressed.

Since the presence of homopolymer unattached to the surface of the substrate is undesirable leading to high extractables and unstable surface characteristics, a homopolymerization-inhibiting agent is usually present in the graft polymerization step of the instant process when only surface modification is desired.

However, that is not the case in the instant process where crosslinked homopolymerization is an important aspect of the instant invention providing a method for encapsulating a substrate by an envelope of the homopolymer. In this process, the ethylenically unsaturated monomer is allowed to be initiated, with a reduced ferrous ion concentration, both by the active free radicals attached to the surface of the substrate as well as by the free active hydroxyl free radical present in the system. No or little homopolymerization-inhibiting agent is present in this variation of the instant process. The entire hydrogel polymer network is covalently bound in a three-dimensional structure through the presence of a crosslinking agent.

The encapsulation of materials with a protective coating which can be removed in a controlled fashion as by weathering or by exposure to a period in the soil is a utility for products made by this process variation. Protective coatings for seeds is contemplated.

It is known that the use of variable valence metal ions, for example ferrous or cuprous, can inhibit homopolymerization during graft polymerization of a substrate containing hydroperoxy groups.

However, while the ferrous ion inhibits homopolymerization, there is a limitation in its use since such ions subsequently penetrate into the polymeric substrate allowing for the desired graft polymerization to occur at an undesired spot, namely in the interior of the substrate.

The effect of this graft polymerization at the wrong place is a distortion of the substrate with a concomitant loss in physical properties and dimensional stability and integrity. Such distortion is generally undesirable for obvious reasons and in the contact lens field is intolerable.

Another aspect of the instant invention is the ability to create a soft polymer skirt around the periphery of a rigid polymer contact lens. Current technology to prepare such modified lenses is complex, laborious and prohibitively uneconomic.

The instant process, however, affords a facile route for the production of such modified lenses. Following the ozonation of the rigid polymeric lens substrate to form peroxy and hydroperoxy groups thereon, the ozonated lens is placed in a mold where the center of the ozonated lens is covered and where the periphery of said ozonated lens is exposed to an aqueous grafting solution containing a hydrophilic monomer and crosslinking agent. The grafting solution will contain an appropriate mixture of hydrophilic and crosslinking monomers to impart the desired properties required for the soft polymer skirt of the contact lens to give the rigid contact lens greatly improved eye comfort and other ancillary benefits not normally associated with rigid contact lenses.

The filled mold containing the appropriate grafting monomers is exposed to UV light. This irradiation decomposes the peroxy and hydroperoxy groups present on the peripheral portion of the ozonated lens to initiate graft and crosslinked copolymerization of the monomer mixture in the mold to form a soft polymer skirt of desired properties firmly bonded via the grafts to the periphery of the rigid contact lens.

The preformed polymeric substrate which can be used in this process can be any fabricated polymeric product such as a film, fiber, pellicle, device or object including contact lenses which is in need of encapsulation or of a coating.

The only requirement is that the polymer from which the fabricated product is made must itself have a hydrocarbon group somewhere in its structure making it amenable to peroxidation and hydroperoxidation when exposed to ozone to form peroxy and hydroperoxy groups on the preformed polymeric substrate surface.

Polymeric materials useful in this instant invention include inter alia polyolefins, polyesters, polyamides, cellulosics, polyurethanes, non-silicone hydrogels, hydrophilic polysiloxanes, hydrophobic polysiloxanes, polymers containing poly(alkylene oxide) units, polycarbonates, silicone rubber, natural and synthetic rubber, epoxy resins, polyvinyl chloride, polystyrene, poly(methyl methacrylate) and copolymers and the like.

The peroxy and hydroperoxy groups are conveniently introduced onto the surface of the preformed polymeric substrate by subjecting said substrate to ozone ($O_3$). This can be done by appropriately suspending, placing or otherwise fixing the preformed substrate in a chamber or vessel so that the surfaces to be modified will be intimately contacted with ozone in a gaseous carrier such as ozonated air or ozonated oxygen or with ozone dissolved in a perhalogenated solvent for a period of time sufficient to result in the requisite uptake of ozone onto the polymer surface to form the desired peroxy and hydroperoxy groups. Generally this time required is less than one hour, usually about 30 minutes.

The reaction temperature is generally not critical, and the reaction can be conducted over a wide temperature range from between 0° and 100° C. For convenience ambient temperatures are preferred.

In order to facilitate the reaction between the polymer substrate and ozone to form the hydroperoxidized substrate, it is preferable for the reaction to be carried out in the presence of a small amount of moisture. Indeed, with hydrogel materials the polymeric substrate can be saturated with water before ozonization is carried out.

Ozone can be conveniently prepared in admixture with a carrier gas by passing an oxygen containing gas, such as air or pure oxygen, through a standard ozone generator. In the case of air, about 2% ozone by weight is generally produced. In the case of pure oxygen, about 4% ozone by weight is characteristically produced.

The ozone prepared by the ozone generator can also be dissolved in a perhalogenated solvent such as inter alia carbon tetrachloride, 1,1,2-trichloro-1,2,2-trifluoroethane, octafluorocyclobutane, perfluorohexane, perfluoroheptane, perfluoro-(1,3-dimethylcyclohexane), perfluorocyclohexane, 1,1,1-trichloro-2,2,2-trifluoroethane, 1,1,1,2-tetrachloro-2,2-difluoroethane and 1,1,2,2-tetrachloro-1,2-difluoroethane. Preferably carbon tetrachloride, perfluoro-(1,3-dimethylcyclohexane), 1,1,2-trichloro-1,2,2-trifluoroethane or perfluorohexane is the perhalogenated solvent of choice.

In an alternative embodiment of the instant invention, the preformed polymer substrate is first saturated or swollen with a solution which is or contains a chain transfer agent before the subsequent ozonization step is carried using ozone dissolved in a perhalogenated solvent. The solution containing the chain transfer agent is insoluble in the liquid medium containing the ozone. The perhalogenated solvents are those mentioned above particularly perfluoro-(1,3-dimethylcyclohexane).

The chain transfer agent is preferably a primary or secondary alkanol of 1 to 4 carbon atoms such as methanol, ethanol, n-propanol, isopropanol, n-butanol, sec-butyl alcohol or isobutyl alcohol. The solution containing the chain transfer agent can also contain water or a tertiary lower alkanol, such as tert-butyl alcohol, to assist in solubilizing the chain transfer agent.

While other materials such as mercaptans are also effective chain transfer agents, mercaptans are precluded from serious consideration for that purpose for aesthetic reasons (poor odor properties).

Isopropanol is a particularly preferred chain transfer agent in the instant process.

Two benefits accrue from this alternative embodiment of the instant invention especially in the case of substrates which are hydrogels. These are:

First, the ozonization occurs on the polymer substrate in the swollen or extended state. The subsequent graft copolymerization can then occur with the substrate already in the normal physical state and size in which the end-use product, i.e. biomedical device, contact lens, etc, will be used minimizing structural and dimensional changes which might otherwise occur during use.

Second, the primary or secondary alcohol acts as a chain transfer agent. The presence of such material inside the swollen polymer substrate helps prevent any subsequent graft polymerization from occurring in the interior of the polymer substrate later in the instant process by limiting the peroxidation and hydroperoxidation to the surface of the substrate.

Another aspect of the instant invention is the ozonation of polysiloxane polymer substrates, particularly contact lenses, in the presence of a perhalogenated hydrocarbon liquid, particularly 1,1,2-trichloro-1,2,2-trifluoroethane. Polysiloxane contact lenses have high surface tack making them stick together when ozonated in gaseous or in aqueous media causing irreparable damage to said lenses when their separation is attempted.

The polysiloxane swells in the perhalogenated hydrocarbon liquid and ozone is highly soluble in said liquid leading to a large (up to 13 times) increase in peroxy and hydroperoxy sites, compared to ozonation in water, on the surface of the polysiloxane lenses suitable for later graft polymerization.

Following the exposure of the preformed polymeric substrate to ozone in some gaseous or liquid medium, the ozonated substrate is allowed to air dry at ambient temperaure to eliminate any residual ozone. While ozonation has occurred primarily at sites on the exposed surfaces, some peroxidized and hydroperoxidized groups may also be present in any adventitious internal intertices or recesses available to the ozone.

Since the ozonated substrate contains peroxy and hydroperoxy groups which are unstable when raised to elevated temperatures, the ozonated substrate can be kept for long periods of time (several months) a low temperature (0° to 20° C.) in an atmosphere of nitrogen without loss of the peroxy and hydroperoxy groups.

In order to prevent undesired changes in overall polymer properties involving the basic integrity of the substrate itself, it is desirable to prevent or at least to minimize any subsequent grafting of the modifying monomer by graft polymerization anywhere on the preformed polymer substrate except on the surface of said substrate.

To prevent the penetration of the grafting monomer into the polymer substrate to any appreciable depth, the ozonated substrate after air drying to remove residual ozone may be treated by several route before graft polymerization is attempted. In each case, the ozonated substrate is purged with nitrogen so that subsequent graft polymerization is not impeded.

If penetration of the ozonated substrate is not expected to be a problem because of the nature of the substrate of the vinyl monomer being used in the graft polymerization for reasons of size, molecular weight, polarity etc, the air-dried, nitrogen-purged ozonated substrate can be used directly for the graft polymerization step without undue fear of appreciable internal penetration of the graft monomer into the substrate.

In those cases where such penetration of the vinyl graft monomer would pose a potential problem, the air-dried ozonated substrate is purged with nitrogen and then saturated with a liquid in order to fill up the internal intertices and recesses of the substrate. The liquid is chosen so that the graft monomer system is essentially insoluble therein. The graft monomer is thus essentially precluded from grafting on the substrate anywhere except on the surface of said substrate. This provides a facile method to direct the grafting to the precise areas where modification of the substrate surface is desired while leaving untouched the gross physical properties of the substrate.

Depending on the solubility properties of the graft monomer system being used, the saturating liquid can be water, an organic hydrocarbon, a perhalogenated hydrocarbon or mixture of liquids.

The organic hydrocarbon liquids useful for saturating the ozonated substrate are inert to vinyl polymerization and include aliphatic, cycloaliphatic and aromatic hydrocarbons such as inter alia hexane, heptane, cyclohexane, toluene and xylene.

The perhalogenated hydrocarbons useful for saturating the ozonated substrate are inter alia carbon tetrachloride, 1,1,2-trichloro-1,2,2-trifluoroethane, octafluorocyclobutane, perfluorohexane, perfluoroheptane, perfluorocyclohexane, 1,1,1-trichloro-2,2,2-trifluoroethane, perfluoro(1,3-dimethylcyclohexane), 1,1,1,2-tetrachloro-2,2-difluoroethane and 1,1,2,2-tetrachloro-1,2-difluoroethane.

Generally, it requires only a relatively small amount of material (by weight) to be actually grafted onto the surface of a polymer substrate to achieve the desired modification in the substrate surface properties.

The graft polymerization is generally carried out using an aqueous solution of an ethylenically unsaturated monomer or mixture of monomers capable of undergoing graft addition polymerization onto the surface of the substrate. In those cases where the monomer is not appreciably soluble in water, a cosolvent, preferably tert-butyl alcohol, is used to enhance the solubility of the monomer in the aqueous graft polymerization system.

If desired, the graft polymerization mixture may contain a catalytic amount of a conventional catalyst characteristically employed in polymerizing vinylic compounds, preferably a free radical catalyst. Of particular interest are the conventional peroxide and azo catalysts such as hydrogen peroxide, benzoyl peroxide, tert-butyl peroctoate or azobis(isobutyronitrile). In many cases, an added initiator is not needed due to the innate activity of the ozonated substrate with its peroxy and hydroperoxy groups.

Additionally where indicated, the graft polymerization can be carried out in the presence of actinic radiation with or without the presence of a photoinitiator.

The choice of the monomer or monomers depends on the nature of the substrate and on the particular surface modification desired. Thus the monomers may be hydrophilic, hydrophobic, crosslinking agents, dyesites, bactericidal or with any of a wide gamut of properties as required to achieve the modification desired.

Suitable hydrophilic monomers include generally water soluble conventional vinyl monomers such as:
acrylates and methacrylates of the general structure

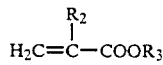

where $R_2$ is hydrogen or methyl and $R_3$ is hydrogen or is an aliphatic hydrocarbon group of up to about 10 carbon atoms substituted by one or more water solubilizing groups such as carboxy, hydroxy, amino, lower alkylamino, lower dialkylamino, a polyethylene oxide group with from 2 to about 100 repeating units, or substituted by one or more sulfate, phosphate, sulfonate, phosphonate, carboxamido, sulfonamido or phosphonamido groups, or mixtures thereof;
acrylamides and methacrylamides of the formula

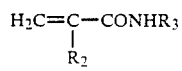

where $R_2$ and $R_3$ are as defined above;
acrylamides and methacrylamides of the formula

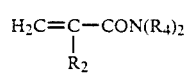

where $R_4$ is lower alkyl of 1 to 3 carbon atoms and $R_2$ is as defined above;
maleates and fumarates of the formula $$R_3OOCCH=CHCOOR_3$$

wherein $R_3$ is as defined above;
vinyl ethers of the formula $$H_2C=CH-O-R_3$$

where $R_3$ is as defined above;
aliphatic vinyl compounds of the formula $$R_2CH=CHR_3$$

where $R_2$ is as defined above and $R_3$ is as defined above with the proviso that $R_3$ is other than hydrogen; and
vinyl substituted heterocycles, such as vinyl pyridines, piperidines and imidazoles and N-vinyl lactams, such as N-vinyl-2-pyrrolidone.

Included among the useful water soluble monomers are:

2-hydroxyethyl-; 2- and 3-hydroxypropyl-; 2,3-dihydroxypropyl-; polyethoxyethyl-; and polyethoxypropyl-acrylates, methacrylates, acrylamides and methacrylamides;

acrylamide, methacrylamide, N-methylacrylamide, N-methylmethacrylamide, N,N-dimethylacrylamide, N,N-dimethylmethacrylamide;

N,N-dimethyl- and N,N-diethyl-aminoethyl acrylate and methacrylate and the corresponding acrylamides and methacrylamides;

2- and 4-vinylpyridine; 4- and 2-methyl-5-vinylpyridine; N-methyl-4-vinylpiperidine; 2-methyl-1-vinylimidazole; N,N-dimethylallylamine; dimethylaminoethyl vinyl ether; N-vinylpyrrolidone; acrylic and methacrylic acid; itaconic, crotonic, fumaric and maleic acids and the lower hydroxyalkyl mono and diesters thereof, such as the 2-hydroxyethyl fumarate and maleate, sodium acrylate and methacrylate; maleic anhydride; 2-methacryloyloxyethylsulfonic acid and allylsulfonic acid.

Preferred water soluble monomers include 2-hydroxyethyl methacrylate, N,N-dimethylacrylamide, acrylic acid and methacrylic acid, and most preferably 2-hydroxyethyl methacrylate.

Suitable hydrophobic copolymerizable monomers include water insoluble conventional vinyl monomers such as:
acrylates and methacrylates of the general formula

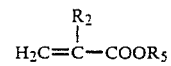

where $R_2$ is as defined above and $R_5$ is a straight chain or branched aliphatic, cycloaliphatic or aromatic group having up to 20 carbon atoms which is unsubstituted or substituted by one or more alkoxy, alkanoyloxy or alkyl of up to 12 carbon atoms, or by halo, especially chloro or preferably fluoro, or $C_3-C_5$ polyalkyleneoxy of 2 to about 100 units;
acrylamides and methacrylamides of the general formula $$H_2C=\underset{\underset{R_2}{|}}{C}-CONHR_5$$

where $R_2$ and $R_5$ are defined above;
vinyl ethers of the formula $$H_2C=CH-O-R_5$$

where $R_5$ is as defined above;
vinyl esters of the formula $$H_2C=CH-OCO-R_5$$

where $R_5$ is as defined above;
maleates and fumarates of the formula $$R_5OOC-HC=CH-COOR_5$$

where $R_5$ is as defined above;
and vinylic substituted hydrocarbons of the formula $$R_2CH=CHR_5$$

where $R_2$ and $R_5$ are as defined above.

Useful hydrophobic monomers include, for example:
methyl, ethyl, propyl, isopropyl, butyl, ethoxyethyl, methoxyethyl, ethoxypropyl, phenyl, benzyl, cyclohexyl, hexafluoroisopropyl or n-octyl-acrylates and -methacrylates as well as the corresponding acrylamides and methacrylamides;
dimethyl fumarate, dimethyl maleate, diethyl fumarate, methyl vinyl ether, ethoxyethyl vinyl ether, vinyl acetate, vinyl propionate, vinyl benzoate, acrylonitrile, styrene, alpha-methylstyrene, 1-hexene, vinyl chloride, vinyl methyl ketone, vinyl stearate, 2-hexene and 2-ethylhexyl methacrylate.

Suitable crosslinking agents are diolefinic monomers such as:
allyl acrylate and methacrylate; alkylene glycol and polyalkylene glycol di-acrylates and -methacrylates, such as ethylene glycol dimethacrylate, and propylene glycol dimethacrylate; trimethylolpropane triacrylate; pentaerythritol tetraacrylate, divinylbenzene; divinyl ether; divinyl sulfone;
bisphenol A diacrylate or methacrylate; methylene-bisacrylamide; diallyl phthalate; triallyl melamine; and hexamethylene diacrylate and dimethacrylate.

The following examples are presented for the purpose of illustration only and are not to be construed to limit the nature or scope of the instant invention in any manner whatsoever.

Effect of Ozonation in a Halocarbon on Hydroperoxide Yield and Degree of Grafting

EXAMPLE 1

Ozonation of Polysiloxane Hydroperoxide Yield

To determine the relative ozonation rates of polysiloxane film in water as compared to perhalogenated hydrocarbons, separate samples of the same polysiloxane film are placed in water and in 1,1,2-trichloro-1,2,2-trifluoroethane (FREON TF or 113) into which ozone, prepared in a standard ozone generator, is passed at room temperature for 30 minutes. The solubility of ozone in water is 4.5 ppm while in FREON TF or 113 is 491 ppm.

The samples of polysiloxane films in the water system clump together very quickly. Analysis of hydroperoxide content (iodometric titration method) in said films shows 0.924 mg/g or a 0.09% hydroperoxide content.

The samples of polysiloxane film ozonated in the FREON TF or 113 system stay separate and analysis of hydroperoxide content on said films shows 12 mg/g or a 1.2% hydroperoxide content.

Clearly ozonation of substrate materials in the FREON system leads to higher hydroperoxide contents in the substrate materials after ozonation.

EXAMPLE 2

Ozonation of Polysiloxane (Degree of Grafting)

With reference to Example 1, several experiments are carried out to show the effect of swelling a silicone macromer film in several halocarbons, such as carbon tetrachloride, 1,1,2-trichloro-1,2,2-trifluoroethane (FREON 113) and perfluoro-(1,3-dimethylcyclohexane), prior to ozonating thereby increasing the hydroperoxidation formation on the surface of the film.

One sample of film is placed in a beaker of carbon tetrachloride, a second film in a beaker of FREON 113 and another sample of film in a beaker of perfluoro-(1,3-dimethylcyclohexane). After each film is equilibrated, ozonization is carried out for five minutes. The films are air dried for 45 minutes. The films are then placed in a grafting solution which contains 100 grams of deionized water, 1.0 gram of N,N-dimethylacrylamide, 0.14 gram of methylene-bisacrylamide and 0.3 gram of ferrous ammonium sulfate hexahydrate with a continuous nitrogen purge. After eight minutes, the films are removed from the grafting solution. The films are distorted, opaque and very lubricious due to the deep and heavy penetration of the graft.

Polysiloxane films ozonated in water for five minutes and grafted under the conditions listed above are only marginally lubricious. Said films are not highly grafted or distorted as the films ozonated in halocarbon because hydroperoxidation is not as great.

EXAMPLE 3

Evaluation of Grafted Polysiloxane Contact Lenses

Polysiloxane contact lenses are ozonated by contact with ozone dissolved in 1,1,2-trichloro-1,2,2-trifluoroethane (FREON TF or 113) for 15 minutes at ambient temperature. The ozonated lenses are then air-dried and placed back into the FREON 113 to swell.

The lenses swollen with the FREON 113 are then placed in a grafting monomer solution of 1 gram of N,N-dimethylacrylamide, 0.14 gram of ethylene glycol dimethacrylate, 0.1 gram of ferrous ammonium sulfate hexahydrate in 50 grams of water and 50 grams of tert-butyl alcohol. Graft polymerization is carried out for 30 minutes at ambient temperatures under nitrogen.

The grafted lenses are then removed from the monomer solution, extracted with water and hydrated with deionized water for testing in the human eye for general acceptability.

After wearing for 15 minutes on the eye, the grafted polysiloxane lens remained clear and wettable with no protein or lipid deposition observed.

An ungrafted polysiloxane control lens completely dewets and turns opaque on contact with the eye after one minute.

EXAMPLE 4

Effect of Graft Composition on Contact Angle

Polysiloxane contact lenses are ozonated and then swollen in FREON 113 as described in Example 3. The ozonated and swollen lenses are then individually placed in selected grafting solutions are described in Example 3 except that varying amounts of the hydrophobic monomer methyl methacrylate is present in said solutions. Contact angles are measured on the grafted lenses to ascertain the effect of methyl methacrylate content on the hydrophobicity of the grafted lenses.

| Methyl Methacrylate Content (grams) in the Grafting Solution | Contact Angle of Grafted Lens |
| --- | --- |
| 0 | 27 |
| 0.1 | 32 |
| 0.2 | 32 |
| 0.4 | 34 |
| 0.8 | 44 |
| 1.0 | 44 |
| ungrafted lens | 80 |

Clearly increasing the hydrophobic character of the graft polymer on the polysiloxane lens surface increases the contact angle and hydrophobicity of the lens appreciably.

Effect of Preswelling the Substrate with a Halocarbon or Hydrocarbon after Ozonation, but Prior to Grafting for Limiting the Graft to the Surface of the Substrate

EXAMPLE 5

A silicone macromer film is ozonated in water for five minutes, allowed to air-dry for thirty minutes and is then placed in a beaker of deionized water with a nitrogen purge for 15 minutes. The film is then place in a grafting solution which is 100 grams of deionized water, 1.0 gram of N,N-dimethylacrylamide, 0.14 gram of methylene-bisacrylamide and 0.3 gram of ferrous ammonium sulfate hexahydrate. The film is kept in the grafting solution for 15 minutes under nitrogen before removal and evaluation. The film is found to be very lubricious, but is opaque and distorted due to deep penetration of the graft into the substrate film.

EXAMPLE 6

The effect of preswelling a substrate with a halocarbon or hydrocarbon prior to grafting to limit the grafting to the surface of the sample is shown in this example.

Polysiloxane contact lenses are ozonated in water for five minutes at ambient temperatures. The lenses are then air-dried for 30 minutes before being placed respectively into beakers of carbon tetrachloride, hexane, 1,1,2-trichloro-1,2,2-trifluoroethane (FREON 113) or perfluoro-(1,3-dimethylcyclohexane). Each beaker is purged with nitrogen and the lenses are kept submerged for 15 minutes.

The swollen lenses are then placed in a grafting solution made up of 100 grams of deionized water, 1.0 gram of N,N-dimethylacrylamide, 0.14 gram of methylene-bisacrylamide and 0.3 gram of ferrous ammonium sulfate hexahydrate. Grafting is carried out under a continuous nitrogen purge for 15 minutes.

The grafted lenses are found to be clear, lubricious and undistorted since grafting of the hydrophilic polymer is limited to the surface of the polysiloxane contact lenses.

This is in contrast to the grafted film prepared in Example 5 which is opaque and distorted due to graft penetration.

EXAMPLE 7

Contact Lens Modification

Polysiloxane contact lenses are treated with ozone in air for one minute to ozonate the surface thereof. The lenses are then air-dried and placed in 1,1,2-trichloro-1,2,2-trifluoroethane (FREON TF or 113) to saturate and swell said lenses.

The lenses are then placed under nitrogen in a solution of 1 gram of N,N-dimethylacrylamide, 0.14 gram of methylene-bisacrylamide and 0.3 gram of ferrous ammonium sulfate hexahydrate in 100 ml of water. Graft polymerization is carried out for 15 minutes at room temperature.

The lenses are then extracted with water. The properties of the grafted lenses and of an ungrafted control are seen in the table below.

| | Ungrafted | Grafted |
| --- | --- | --- |
| Lens thickness (microns) | 104 | 102 |
| Oxygen Flux* | 0.65 | 0.66 |
| Oxygen Permeability** | 76.6 | 72.8 |
| Contact Angle | | |
| Advancing | 94 | 25 |
| Receding | 51 | 25 |

*Oxygen Flux in $\mu l\ O_2/cm^2$ min
**Oxygen Permeability $O_2 - Dk = cm^3$ (STP) $\times\ cm/cm^2 \times sec - cm\ Hg$ Effect of a Chain Transfer Agent During Ozonation for Limiting the Graft to the Surface of the Substrate

EXAMPLE 8

A silicone macromer film is ozonated in water for five minutes at ambient temperature, allowed to air-dry for thirty minutes, and then is placed in a beaker of deionized water with a nitrogen purge for 15 minutes. The film is then placed in a grafting solution which is made up of 100 grams of deionized water, 1.0 gram of N,N-dimethylacrylamide, 0.14 gram of methylene-bisacrylamide, and 0.3 gram of ferrous ammonium sulfate hexahydrate. Grafting is carried out over a 15-minute period under a nitrogen purge. The grafted film is very lubricious, but is also opaque and distorted due to the deep penetration of the grafting material into the substrate film.

EXAMPLE 9

A siloxane macromer film equilibrated in an aqueous 10% isopropanol solution (90 grams of water and 10 grams of isopropyl alcohol) is dipped into a beaker of deionized water for five seconds, is then placed into a cylinder containing perfluoro-(1,3-dimethylcyclohexane) and ozonated for five minutes. After air drying for thirty minutes, the film is placed in a beaker of deionized water with a nitrogen purge for 15 minutes before being placed in a grafting solution which is made up of 100 grams of deionized water, 1.0 gram of N,N-dimethylacrylamide, 0.14 gram of methylene-bisacrylamide and 0.3 gram of ferrous ammonium sulfate hexahydrate.

Grafting is carried out under nitrogen for 15 minutes. The film is then removed and evaluated. The grafted film is clear, lubricious and undistorted since the grafting has been limited to the surface of the substrate due to the chain transfer characteristics of the aqueous isopropanol system.

This is in contrast to the grafted film prepared in Example 8 which is opaque and distorted due to graft penetration.

EXAMPLE 10

An experiment to show the effect of the chain transfer agent on subsequent grafting is carried out following the general procedure given in Example 9 except that the amount of time the equilibrated silicone macromer film is dipped in water is reduced from five (5) seconds to three (3) seconds.

After the grafting step is completed, the film is not as lubricious as the film obtain in Example 9.

It is clear that the amount of chain transfer agent (isopropanol in this case) present in the equilibrated substrate film is determinative of the amount of subsequent grafting which can take place. In this case there is more isopropanol present, and consequently less grafting takes place.

EXAMPLE 11

The effect of the amount of chain transfer agent present has on the amount of subsequent grafting is also demonstrated when the procedure of Example 9 is exactly repeated except for the concentration of the aqueous 50% isopropanol solution (50 grams of water and 50 grams of isopropyl alcohol) used to equilibrate the siloxane macromer film.

After the grafting step is completed, the film is not as lubricious as the film obtained in Example 9 again showing that that an increased amount of chain transfer agent (isopropanol in this case) present in the equilibrated substrate reduces the amount of subsequent grafting which can occur.

EXAMPLE 12

A silicone macromer film is placed in an aqueous 10% isopropanol solution (90 grams of water and 10 grams of isopropyl alcohol) and ozonated for five minutes at ambient temperature. After air-drying for 15 minutes, the film is placed in a beaker of water with a nitrogen purge for 15 minutes. It is then placed in a grafting solution of 100 grams deionized water, 1.0 gram N,N-dimethylacrylamide, 0.14 gram of methylene-bisacrylamide and 0.3 gram of ferrous ammonium sulfate hexahydrate for thirty minutes.

After this time the film is removed and found to be clear and ungrafted totally unlike the grafted film of Example 8 which is very lubricious, opaque and distorted.

The only difference between the procedures of Example 8 and of Example 12 is the presence of an excess amount of chain transfer agent (isopropanol) in this Example which prevents any grafting from occurring.

EXAMPLE 13

A polysiloxane-polyurethane film is equilibrated in isopropyl alcohol and then ozonated for ten minutes in perfluoro-(1,3-dimethylcyclohexane) at ambient temperature.

A control film, not first equilibrated in isopropanol, is also ozonated for ten minutes in perfluoro-(1,3-dimethylcyclohexane) at ambient temperature.

Each ozonated film is then placed in a beaker of water. The film equilibrated with isopropanol remains clear while the control film, not equilibrated with isopropanol, becomes very opaque.

Polar hydroperoxide groups form in the ozonated control film allowing for the water uptake which leads to opacity.

In the ozonated film, first equilibrated with isopropanol, hydroperoxy groups are not present since the chain transfer agent (isopropanol) prevents their formation by transfer of a hydrogen atom to the free radical produced on the film during ozonization. Thus, the film is protected from hydroperoxide formation and film clarity is preserved.

EXAMPLE 14

A polysiloxane film is placed in 1,1,2-trichloro-1,2,2-trifluoroethane (FREON 113 or TF) and is exposed to ozone at ambient temperature for 15 minutes to ozonate the surface of said film. The film is then removed and allowed to air-dry for 25 minutes. It is then placed in water with a continuous nitrogen purge for 15 minutes.

The ozonated film is then submersed in a grafting solution composed of 100 grams of water, 1.0 gram of N,N-dimethylacrylamide, 0.14 gram of methylenebisacrylamide and 0.3 gram of ferrous ammonium sulfate hexahydrate. A continuous nitrogen purge is used throughout the 30-minute grafting time.

The film is then removed from the grafting solution and rinsed with water. A dense graft is formed at the surface of the film. This is evidenced by a lubricious and non-swollen grafted substrate product.

EXAMPLE 15

A second polysiloxane film is ozonated and grafted as described in Example 14. However, in this case the level of ferrous ammonium sulfate hexahydrate included in the grafting solution is reduced from 0.3 gram down to 0.1 gram.

In this case the grafted and water rinsed polysiloxane film is completely encapsulated in a hydrogel envelope. The envelope is several millimeters thick in the hydrated state.

The hydrogel capsule is non-dissolvable showing that it is highly crosslinked. The hydrogel has a high water content as observed in dehyration-rehydration experiments which show that hydration and dehydration is reversible with said hydrogels.

Examples 14 and 15 demonstrate the effect of ferrous ion concentration on the ability of the grafting solution to generate a hydrogel capsule around a specific substrate. By controlling the ferrous ion concentration, it is possible to allow for the decomposition of the hydroperoxide to an alkoxy and hydroxyl radical. With a reduced ferrous ion concentration, the hydroxyl radical is not converted to the hydroxyl ion, but instead initiates a growing polymer in the grafting solution which is crosslinked to the graft polymer on the surface of the substrate. The result is a crosslinked hydrogel capsule around the substrate and attached to said substrate as well.

EXAMPLE 16

Preparation of Soft Skirted Contact Lenses

Some rigid polysiloxane contact lenses are placed in 1,1,2-trichloro-1,2,2-trifluoroethane (FREON TF or 113) and ozonated for 15 minutes at room temperature to form peroxy and hydroperoxy groups on the surface thereof. The lenses are then air-dried and hydrated with deionized water under nitrogen for 45 minutes.

The lenses are then placed in molds which cover the center of each lens and which leave the periphery of each lens uncovered. A solution of 2-hydroxyethyl methacrylate containing 5.5% by weight of ethylene glycol dimethacrylate crosslinking agent is purged by nitrogen and brought into contact with the peripheral area of the contact lens in the mold under nitrogen. This area is then irradiated under nitrogen with UV light for 3 hours to cause graft and copolymerization to occur.

Each lens is observed to have an appropriate intact soft polymer skirt firmly attached thereto.

What is claimed is:

1. A process for encapsulating a preformed polymer substrate by treating said substrate with ozone to form peroxy and hydroperoxy groups thereon and graft copolymerizing said peroxidized and hydroperoxidized substrate with a ethylenically unsaturated monomer or monomer mixture which must contain at least one crosslinking monomer to encapsulate the preformed polymer substrate with a coating of crosslinked polymer derived from said monomer or monomer mixture, wherein the improvement consists essentially of saturating or swelling the substrate with a liquid before or after the ozonation step, said liquid being insoluble in the ethylenically unsaturated monomer or monomer mixture.

2. A process according to claim 1 wherein the copolymerization step is carried out in the absence of or in presence of only a low concentration of a variable metal ion to foster homopolymerization during grafting of the ethylenically unsaturated monomer or monomer mixture.

3. A process according to claim 2 wherein the metal ion is ferrous.

4. A process according to claim 1 wherein ozonation is carried out in water, air, oxygen or a perhalogenated hydrocarbon medium.

5. A process according to claim 4 wherein ozonation is carried out in a perhalogenated hydrocarbon medium.

6. A process according to claim 1 for making a soft polymer skirt around the periphery of a rigid polymeric contact lens which comprises ozonating a rigid polymeric contact lens substrate to form peroxy and hydroperoxy groups thereon, placing the ozonated lens in a mold wherein the center of the lens is covered and the periphery of said ozonated lens is exposed to an aqueous grafting solution containing a mixture of a hydrophilic vinyl monomer and a vinyl crosslinking agent, and irradiating the mold with UV light to decompose the peroxy and hydroperoxy groups present in the peripheral portion of the ozonated lens to initiate graft crosslinked copolymerization with the vinyl monomers in the grafting solution to form a graft copolymerized crosslinked soft vinyl polymer skirt around the periphery of the rigid contact lens and attached thereto thereby increasing eye comfort for and wearability of said lens.

7. A process according to claim 6 wherein the hydrophilic vinyl monomer is 2-hydroxyethyl methacrylate and the vinyl crosslinking agent is ethylene glycol dimethacrylate.

8. A process for encapsulating a preformed polymer substrate which comprises first contacting said polymer substrate with a solution which is or contains a chain transfer agent to saturate or swell said polymer, said solution being insoluble in the perhalogenated liquid medium used subsequently during the ozonation step, to limit subsequent hydroperoxidation and peroxidation to the surface of said polymer, ozonating the saturated or swollen polymer with ozone dissolved in a perhalogenated liquid medium insoluble in the solution containing the chain transfer agent, and graft copolymerizing said peroxidized and hydroperoxidized substrate with an ethylenically unsaturated monomer or monomer mixture which must contain at least one crosslinking monomer to encapsulate the performed polymer substrate with a coating of crosslinked polymer derived from said monomer or monomer mixture.

9. A process according to claim 8 wherein the copolymerization step is carried out in the absence or in the presence of only a low concentration of a variable metal ion to foster homopolymerization during grafting of the ethylenically unsaturated monomer or monomer mixture.

10. A process according to claim 9 wherein the metal ion is ferrous.

11. A process according to claim 8 wherein the perhalogenated liquid medium is carbon tetrachloride, 1,1,2-trichloro-1,2,2-trifluoroethane, perfluorohexane or perfluoro-(1,3-dimethylcyclohexane).

12. A process according to claim 11 wherein the perhalogenated liquid medium is perfluoro-(1,3-dimethylcyclohexane).

13. A process according to claim 8 for making a soft polymer skirt around the periphery of a rigid polymeric contact lens which comprises ozonating a rigid polymeric contact lens substrate to form peroxy and hydroperoxy groups thereon, placing the ozonated lens in a mold wherein the center of the lens is covered and the periphery of said ozonated lens is exposed to an aqueous grafting solution containing a mixture of a hydrophilic vinyl monomer and a vinyl crosslinking agent, and irradiating the mold with Uv light to decompose the peroxy and hydroperoxy groups present in the peripheral portion of the ozonated lens to initiate graft crosslinked copolymerization with the vinyl monomers in the grafting solution to form a graft copolymerized crosslinked soft vinyl polymer skirt around the periphery of the rigid contact lens and attached thereto thereby increasing eye comfort for and wearability of said lens.

14. A process according to claim 13 wherein the hydrophilic vinyl monomer is 2-hydroxyethyl methacrylate and the vinyl crosslinking agent is ethylene glycol dimethacrylate.

15. A process according to claim 8 wherein the chain transfer agent is a primary or secondary alkanol of 1 to 4 carbon atoms.

16. A process according to claim 15 wherein the chain transfer agent is dissolved in water or in an aqueous solution containing tert-butyl alcohol.

17. A process according to claim 15 wherein the chain transfer agent is isopropanol.

18. A process according to claim 8 wherein the perhalogenated liquid medium is carbon tetrachloride, 1,1,2-trichloro-1,2,2-trifluoroethane, perfluorohexane or perfluoro-(1,3-dimethylcyclohexane).

19. A process according to claim 18 wherein the perhalogenated liquid medium is perfluoro-(1,3-dimethylcyclohexane).

* * * * *